United States Patent
Gao et al.

(10) Patent No.: US 9,853,745 B2
(45) Date of Patent: Dec. 26, 2017

(54) PULSE INTERFERENCE SUPPRESSING METHOD AND APPARATUS, AND COMPUTER READABLE STORAGE MEDIUM IN COMMUNICATIONS SYSTEM

(71) Applicant: ZTE CORPORATION, Shenzhen, Guangdong Province (CN)

(72) Inventors: Ming Gao, Shenzhen (CN); Bin Li, Shenzhen (CN); Hongfeng Yuan, Shenzhen (CN); Ou Li, Shenzhen (CN)

(73) Assignee: XI'AN ZHONGXING NEW SOFTWARE CO LTD, Xi'An, Shaanxi (CN)

( * ) Notice: Subject to any disclaimer, the term of this patent is extended or adjusted under 35 U.S.C. 154(b) by 0 days.

(21) Appl. No.: 14/899,125

(22) PCT Filed: Dec. 31, 2013

(86) PCT No.: PCT/CN2013/091121
§ 371 (c)(1),
(2) Date: Dec. 17, 2015

(87) PCT Pub. No.: WO2014/201843
PCT Pub. Date: Dec. 24, 2014

(65) Prior Publication Data
US 2016/0149650 A1 May 26, 2016

(30) Foreign Application Priority Data
Jun. 20, 2013 (CN) .......................... 2013 1 0247195

(51) Int. Cl.
*H04B 15/00* (2006.01)
*H04B 1/10* (2006.01)
(Continued)

(52) U.S. Cl.
CPC .......... *H04B 15/00* (2013.01); *H04B 1/1036* (2013.01); *H04K 3/00* (2013.01); *H04W 16/14* (2013.01)

(58) Field of Classification Search
CPC ...... H03G 3/345; H03G 11/00; H04B 1/1027; H04B 1/1036; G01S 7/36; G01S 7/021
See application file for complete search history.

(56) References Cited

U.S. PATENT DOCUMENTS 6,546,057 B1 * 4/2003 Yeap ........................ H04B 1/10
375/285
9,253,122 B1 * 2/2016 Zhang ................... H04L 49/405
(Continued)

FOREIGN PATENT DOCUMENTS

CN 101179283 A 5/2008
CN 102202025 A 9/2011

*Primary Examiner* — Aristocratis Fotakis
(74) *Attorney, Agent, or Firm* — Ling Wu; Stephen Yang; Ling and Yang Intellectual Property

(57) ABSTRACT

A method and apparatus for pulse interference suppression, and a computer readable storage medium in a communication system are provided in the embodiments of the present invention. The method includes: judging a location where pulse interference occurs according to a power of a signal; and performing suppression processing on a data segment interfered by a pulse in the location. After judging that the pulse interference exists in the location, a receiver in the communication system discards the data segment interfered by the pulse in the location, and feeds back an indication that the data are not received.

7 Claims, 2 Drawing Sheets

```
┌─────────────────────────────────────┐
│  A location where pulse interference│
│ occurs is judged according to a power│─ S11
│            of a signal              │
└─────────────────────────────────────┘
                  │
                  ▼
┌─────────────────────────────────────┐
│ Suppression processing is performed │
│ on a data segment interfered by a pulse│─ S12
│          in the location            │
└─────────────────────────────────────┘
```

(51) Int. Cl.
*H04W 16/14* (2009.01)
*H04K 3/00* (2006.01)

(56) References Cited

U.S. PATENT DOCUMENTS

| | | | |
|---|---|---|---|
| 2004/0203392 A1* | 10/2004 | Hsu | H04L 1/0003 455/62 |
| 2008/0253764 A1* | 10/2008 | Collings | H04B 10/07955 398/37 |
| 2009/0168929 A1* | 7/2009 | Liu | H03G 3/345 375/346 |
| 2009/0316766 A1* | 12/2009 | Korobkov | H04B 3/54 375/227 |
| 2010/0008454 A1* | 1/2010 | Schnell | H04L 27/2647 375/346 |
| 2010/0029235 A1 | 2/2010 | Bouillet | |
| 2010/0238894 A1* | 9/2010 | Ringstrom | H04L 1/0006 370/329 |
| 2011/0038405 A1* | 2/2011 | Axnas | H04B 1/1027 375/227 |
| 2011/0228836 A1* | 9/2011 | Yang | H04B 3/235 375/230 |
| 2011/0280261 A1* | 11/2011 | Varadarajan | H04L 27/2602 370/475 |
| 2012/0033722 A1* | 2/2012 | Varadarajan | H04B 3/46 375/227 |
| 2017/0111069 A1* | 4/2017 | Dafesh | H04B 1/1027 |

* cited by examiner

Shape of the transmitted pulse of the DME system

Pulse interval  Inquiry X channel  12 ±0.5 microseconds
                Inquiry Y channel  36 ±0.5 microseconds
                Answer X channel   12 ±0.5 microseconds
                Answer Y channel   30 ±0.5 microseconds

PULSE INTERFERENCE SUPPRESSING METHOD AND APPARATUS, AND COMPUTER READABLE STORAGE MEDIUM IN COMMUNICATIONS SYSTEM

TECHNICAL FIELD

The present document relates to the field of communication technology, and particularly, to a method and apparatus for pulse interference suppression, and a computer readable storage medium in a communication system.

BACKGROUND OF THE RELATED ART

In a communication system, there are various reasons to generate the pulse interference, which includes both the interference caused by objective natural environments such as thunder and lightning and coexistence of multisystem and the human-induced interference. The influence of the pulse interference on the performance of the communication system is great, and when the interference exceeds the power capacity of a receiver, physical damages of the receiver may be caused. Therefore, it is necessary to perform corresponding pulse interference suppression. The pulse interference processing methods commonly used at present are to perform characteristic analysis on signals in a transform domain, perform matching according to the characteristics, detect whether pulse interference exists and a location where the pulse interference exists, perform complicated signal processing on data at the location of the pulse interference according to an pulse interference indication, and restore the interfered data. When there are more pulse interference signal parameters, the complexity of implementing these processing methods is high, which is disadvantageous to timely outputting a detection result and taking corresponding interference suppression measures.

In a plurality of communication systems used for transportations such as air lines or high-speed rails and so on, the systems such as the air lines or high-speed rails have measurement devices used for guaranteeing the normal operation of transportation, and working bands of the devices may be close to working bands of the communication signals, the pulse interferes with the communication signals, and especially when these measurement signals are sent in a form of pulses, the influence on the communication signals is much more serious.

SUMMARY

The embodiments of the present document provide a method and apparatus for pulse interference suppression, and a computer readable storage medium in a communication system, to timely output a detection result of the pulse interference and take corresponding interference suppression measures.

The embodiment of the present document provides a method for pulse interference suppression in a communication system, which comprises:

judging a location where pulse interference occurs according to a power of a signal; and performing suppression processing on a data segment interfered by a pulse in the location.

Alternatively, the above method is further characterized in that: said performing suppression processing on a data segment interfered by a pulse in the location comprises:

after judging that the pulse interference exists in the location, a receiver in the communication system discarding the data segment interfered by the pulse, and feeding back an indication that the data are not received.

Alternatively, the above method is further characterized in that: said judging a location where pulse interference occurs according to a power of a signal comprises:

segmenting the signal, and calculating a power of each segment of the signal; and comparing powers of every two adjacent segments of the signal in turn, and if a power ratio is greater than a threshold value, judging the location where the pulse interference occurs according to a power difference of every two adjacent segments of the signal.

Alternatively, the above method is further characterized in that: said segmenting the signal comprises:

according to pulse interference characteristics, segmenting the signal in a frequency domain.

Alternatively, the above method is further characterized in that: said segmenting the signal comprises:

segmenting the signal according to a duration of the pulse interference, and if the duration of the pulse interference is not fixed, segmenting the signal with a shortest duration as a unit.

Alternatively, the above method is further characterized in that:

the threshold value is set according to amplitude ranges of the impulse interference and a normal signal in the communication system.

The embodiment of the present document further provides an apparatus for pulse interference suppression in a communication system, which comprises:

a first module, configured to judge a location where pulse interference occurs according to a power of a signal; and a second module, configured to perform suppression processing on a data segment interfered by a pulse in the location.

Alternatively, the above apparatus is further characterized in that:

the second module performs suppression processing on the data segment interfered by the pulse in the location by means of: after judging that the pulse interference exists in the location, a receiver in the communication system discarding the data segment interfered by the pulse, and feeding back an indication that the data are not received.

Alternatively, the above apparatus is further characterized in that: the first module comprises:

a first unit, configured to: segment the signal, and calculate a power of each segment of the signal; and a second unit, configured to: compare powers of every two adjacent segments of the signal in turn, and if a power ratio is greater than a threshold value, judge the location where the pulse interference occurs according to a power difference of every two adjacent segments of the signal.

Alternatively, the above apparatus is further characterized in that:

the first unit segments the signal by means of: according to pulse interference characteristics, segmenting the signal in a frequency domain.

Alternatively, the above apparatus is further characterized in that:

the first unit segments the signal by means of: segmenting the signal according to a duration of the pulse interference, and if the duration of the pulse interference is not fixed, segmenting the signal with a shortest duration as a unit.

Alternatively, the above apparatus is further characterized in that:

the threshold value is set according to amplitude ranges of the impulse interference and a normal signal in the communication system.

The embodiment of the present document further provides a computer readable storage medium for pulse interference suppression in a communication system, which comprises: a set of instructions, wherein the instructions are used for executing the above method for the pulse interference suppression in the communication system.

In conclusion, the embodiments of the present document provide a method and apparatus for pulse interference suppression, and a computer readable storage medium in a communication system, which can timely output a detection result of the pulse interference, and take corresponding interference suppression measures, and effectively reduce the influence of the pulse interference.

PREFERRED EMBODIMENTS OF THE INVENTION

The embodiments of the present document will be described in detail in combination with the accompanying drawings below. It should be noted that the embodiments in the present document and the characteristics in the embodiments can be optionally combined with each other in the condition of no conflict.

Figure 1:
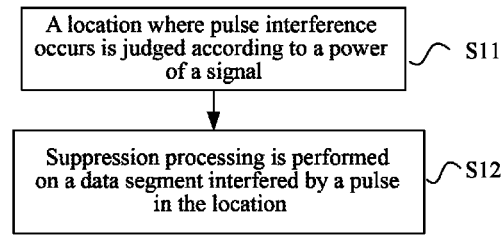
FIG. 1 is a flow chart of a method for pulse interference suppression in a communication system according to the embodiment of the present document.

FIG. 1 is a flow chart of a method for pulse interference suppression in a communication system according to the embodiment of the present document, and as shown in FIG. 1, the method of the embodiment includes the following steps.

In step S11, a location where pulse interference occurs is judged according to a power of a signal.

Firstly the signal can be segmented, and segmentation is performed on the signal according to a duration of the pulse interference, and if the duration of the pulse interference is not fixed, the segmentation is performed on the signal with a shortest duration of the pulse interference as a unit, and then the intra-segment power of each segment of the signal is calculated.

Selectively, the segmentation can be performed on the signal in a frequency domain according to pulse interference characteristics.

Powers of every two adjacent segments of the signal is compared in turn, if a power ratio is greater than a certain threshold value, the interference exists, an identifier '1' is placed in a location of the first segment of the signal in the two segments, and if the power ratio is not greater than the threshold value, an identifier '0' is placed. The location of the interference is judged according to the locations of '0' and '1' in the array, and the threshold value can be set according to amplitude ranges of the impulse interference and a normal signal in the communication system.

In step S12, suppression processing is performed on a data segment interfered by a pulse in the location.

After judging that the pulse interference exists in the location, a receiver in the communication system discards the data segment interfered by the pulse, and feeds back an indication that the data are not received.

In the common communication retransmission mechanism, the retransmitted data and the previous data parsed mistakenly are combined to reduce a code rate and improve the demodulation performance, which improves the demodulation performance better for a decoding error caused by noise or channel fading. However, the inventor discovers that, with regard to a demodulation error caused by a large amplitude of pulse interference, especially when the duration of the pulse interference is longer, the common retransmission mechanism cannot bring the data combination gain, in the contrary, it introduces the pulse interference into the retransmitted data, which affects the demodulation performance after the combination is made. Therefore, in the embodiments of the present document, the behavior of the receiver in the pulse interference is restrained: the receiver discards the data segment interfered by the pulse, thus, in the communication system with the retransmission mechanism, the performance loss due to that the interfered data segment participates in the data combination can be avoided.

One specific embodiment of the present document will be given below.

Figure 2:
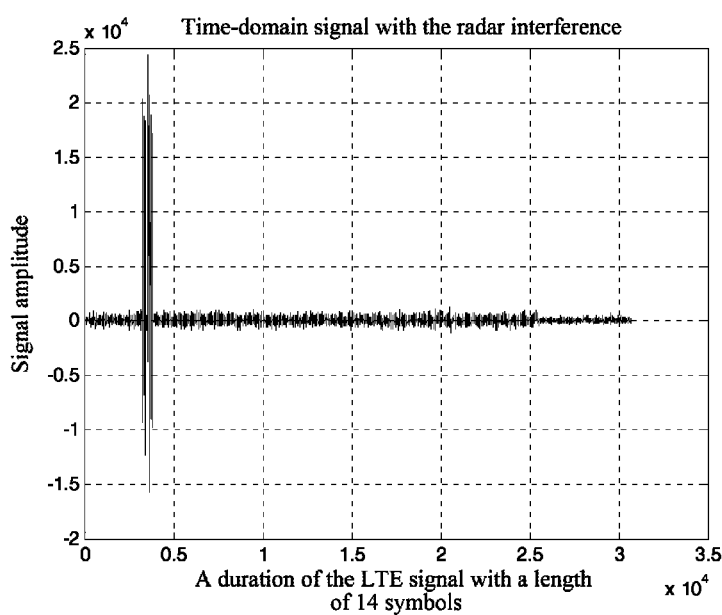
FIG. 2 is a time-domain signal of the LTE signal with the radar interference according to the embodiment of the present document.
Figure 3:
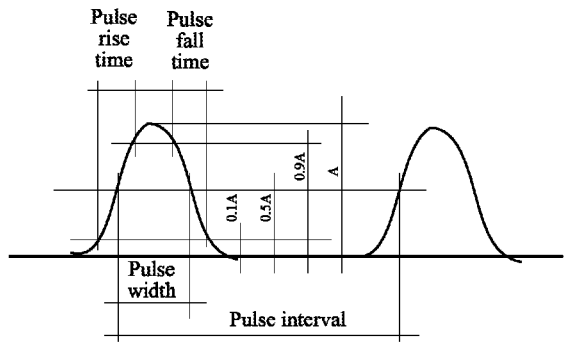
FIG. 3 is a schematic diagram of a radar pulse signal.

When the frequency spectrum is planned, frequency bands of a Long Term Evolution (LTE) wireless communication system may be partially overlapped with frequency bands of a radar system, and the radar system transmits signals in a form of pulses, a typical ranging radar pulse is as shown in FIG. 2, it is a pulse pair of maximum 90 times per second, an interval between two pulses of the pulse pair is about 12 us or 30 us, the broadband of each pulse is about 4 us, and the strength is 500 W power. When a Distance Measure Equipment (DME) is within LTE aircraft receiving frequency points (within the 5 MHz), the received power of an LTE airborne station is 3 dBm; and when the DME is beyond LTE aircraft receiving frequency points (1 MHz), the received power of the LTE airborne station is 23 dBm, but the maximum signal received power covered by the LTE airline itself is only −60 dBm. Therefore, when the frequency band of the airline and the frequency band of the DME are very close, strong pulse interference will exist as shown in FIG. 3, and thus it is required to detect a subframe in which the pulse interference exists and perform subsequent interference suppression processing.

The processing process in the embodiment is as follows.

a) in combination with the implementation simplicity and interference suppression strategy, the signal is segmented with a symbol length in the LTE system as a unit and the signal power of each symbol length is calculated.

b) powers of every two adjacent symbols are compared, if a power ratio is greater than a set threshold value, the interference exists, an identifier '1' is placed in a location of the first symbol in the two symbols, and if the power ratio is not greater than the threshold value, an identifier '0' is placed. The locations of symbols interfered are judged according to an obtained flag bit array. The method for judging the interference locations is as follows: finding out every two adjacent '1' in the flag bit array (if '0' exists between two '1', it is also considered as adjacent), a location starting from the first '1' to the second '1' is the location of the symbol interfered. In the signal shown in FIG. 3, the flag bit array obtained after comparing the power difference of the adjacent symbols is '1 1 0 0 0 0 0 0 0 0 0 0 0', the first two bits in the array are two adjacent '1', and the location starting from the first '1' to the second '1' indicates that the interference exists in the second symbol.

c) according to the location of the symbol interfered, it is to judge whether pulse interference exists in a subframe in which the symbol interfered is located, and if the pulse interference exists, discard the data interfered of the subframe and feed back DTX information, and not maintain DCI information scheduled at this time. It can be guaranteed that the subframe data interfered will not participate in the HARQ combination through such processing, thereby reducing the influence of the pulse interference.

The embodiment of the present document is used in any communication system in which the pulse interference exists, such as an LTE system and a Universal Mobile Telecommunications System (UMTS) and so on.

Figure 4:
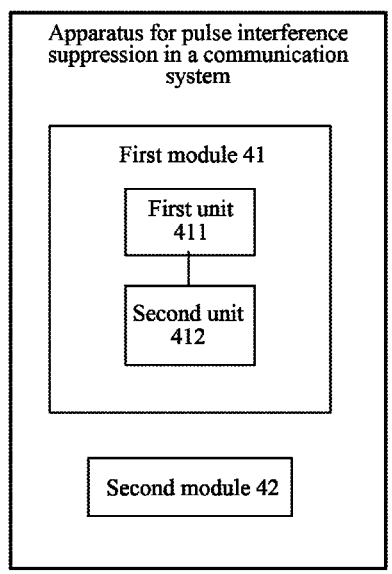
FIG. 4 is a schematic diagram of an apparatus for pulse interference suppression in a communication system according to the embodiment of the present document.

FIG. 4 is a schematic diagram of an apparatus for pulse interference suppression in a communication system according to the embodiment of the present document, and as shown in FIG. 4, the apparatus of the embodiment includes:

a first module 41, configured to judge a location where pulse interference occurs according to a power of a signal; and a second module 42, configured to perform suppression processing on a data segment interfered by a pulse in the location.

Wherein, the second module 42 performs suppression processing on the data segment interfered by the pulse in the location by means of: after judging that the pulse interference exists in the location, a receiver in the communication system discarding the data segment interfered by the pulse, and feeding back an indication that the data are not received.

Wherein, the first module 41 includes:

a first unit 411, configured to: segment the signal, and calculate a power of each segment of signal; and a second unit 412, configured to: compare powers of every two adjacent segments of the signal in turn, and if a power ratio is greater than a threshold value, judge the location where the pulse interference occurs according to a power difference of every two adjacent segments of the signal.

In one preferred embodiment, the first unit 411 performs segments the signal by means of: segmenting the signal according to a duration of the pulse interference, and if the duration of the pulse interference is not fixed, segmenting the signal with a shortest duration as a unit.

Selectively, the segmentation can be performed on the signal in a frequency domain according to pulse interference characteristics.

The communication system includes but is not limited to: a system in which the pulse interference may exist, such as a long term evolution communication system or a universal mobile telecommunications system.

The people skilled in the art should understand that the embodiment of the present document can be provided as a method, a system or a computer program product. Therefore, a form of hardware embodiment, a form of software embodiment or a form of embodiment combining software aspect and hardware aspect can be used in the present document. Moreover, a form of computer program product executed on one or a plurality of computer available memory mediums (including but not limited to a disk memory and an optical memory and so on) which contain computer available program codes.

The present document is described according to the flow diagrams and/or block diagrams of the method, device (system) and computer program product of the embodiments of the present document. It should be understood that each flow and/or block in the flow diagrams and/or block diagrams and a combination of flow and/or block in the flow diagrams and/or block diagrams can be implemented by computer program instructions. These computer program instructions can be provided to a general-purpose computer, a special-purpose computer, an embedded processor or processors of other programmable data processing devices to generate a machine, which makes the instructions executed by the computer or processors of other programmable data processing devices generate a device used for implementing functions specified in one or multiple flows of the flow diagrams and/or in one or multiple blocks of the block diagrams.

These computer program instructions also can be stored in a computer readable memory which can guide the computer or other programmable data processing devices to work in a specific way, which makes the instructions stored in the computer readable memory generate manufactures including an instruction device, and the instruction device implements functions specified in one or multiple flows of the flow diagrams and/or in one or multiple blocks of the block diagrams.

These computer program instructions also can be loaded on the computer or other programmable data processing devices, which makes a series of operation steps be executed on the computer or other programmable devices to generate processing implemented by the computer, thus, the instructions executed by the computer or other programmable devices provide the steps used for implementing functions specified in one or multiple flows of the flow diagrams and/or in one or multiple blocks of the block diagrams.

Therefore, the embodiment of the present document also provides a computer readable storage medium, and the storage medium includes a set of instructions, and the instructions are used for executing the method for the pulse interference suppression in the communication system in the above embodiment.

The ordinary person skilled in the art can understand that all or part of the steps in the above method can be completed by a program instructing related hardware, and the program can be stored in a computer readable memory medium, such as a read-only memory, disk or optical disk and so on. Alternatively, all or part of the steps of the above examples also can be implemented by using one or multiple integrated circuits. Correspondingly, each module/unit in the above examples can be implemented in a form of hardware, and also can be implemented in a form of software function module. The present document is not limited to any combination of hardware and software in a specific form.

The above description is only the preferred embodiments of the present document. Certainly, the present document can still have other various embodiments, the skilled person familiar with the art can make various corresponding changes and transformations according to the present document without departing from the spirit and essence of the present document, and these corresponding changes and transformations shall all fall into the protection scope of the appended claims of the present document.

INDUSTRIAL APPLICABILITY

In conclusion, the embodiments of the present document provide a method and apparatus for pulse interference suppression, and a computer readable storage medium in a communication system, which can timely output a detection result of the pulse interference, and take corresponding interference suppression measures, and effectively reduce the influence of the pulse interference.

What is claimed is:

1. A method for pulse interference suppression in a communication system, comprising:
   determining, by a receiver in the communication system, a location where pulse interference occurs according to a power of a signal; and
   performing, by the receiver, suppression processing on a data segment interfered by a pulse in the location;
   wherein, said determining a location where pulse interference occurs according to a power of a signal comprises:
   segmenting the signal according to a duration of the pulse interference, when the duration of the pulse interference is not fixed, segmenting the signal in units of a shortest duration of the pulse interference, and calculating a power of each segment of the signal; and
   comparing the powers of every two adjacent segments of the signal in turn, and determining the location where the pulse interference occurs according to a ratio of the powers of every two adjacent segments of the signal, when the ratio of the powers of two adjacent segments of the signal is greater than a threshold value, determining that a pulse interference exists.

2. The method according to claim 1, wherein, said performing suppression processing on a data segment interfered by a pulse in the location comprises:
   after determining that the pulse interference exists in the location, discarding the data segment interfered by the pulse, and feeding back an indication that data are not received.

3. The method according to claim 1, wherein, the threshold value is set according to amplitude ranges of the pulse interference and the signal in the communication system.

4. A non-transitory computer readable storage medium, comprising: a set of instructions, wherein the instructions are used for executing the method for pulse interference suppression in a communication system according to claim 1.

5. A receiver for pulse interference suppression in a communication system, comprising hardware performing instructions stored in a non-transitory computer readable medium which executes following steps:
   determining a location where pulse interference occurs according to a power of a signal; and
   performing suppression processing on a data segment interfered by a pulse in the location;
   wherein, said determining a location where pulse interference occurs according to a power of a signal comprises:
   segmenting the signal according to a duration of the pulse interference, when the duration of the pulse interference is not fixed, segmenting the signal in units of a shortest duration of the pulse interference, and calculating a power of each segment of the signal; and
   comparing the powers of every two adjacent segments of the signal in turn, and determining the location where the pulse interference occurs according to a ratio of the powers of every two adjacent segments of the signal, when the ratio of the powers of two adjacent segments of the signal is greater than a threshold value, determining that a pulse interference exists.

6. The apparatus receiver according to claim 5, wherein, said performing suppression processing on the data segment interfered by the pulse in the location comprises:
   after determining that the pulse interference exists in the location, discarding the data segment interfered by the pulse, and feeding back an indication that data are not received.

7. The apparatus receiver according to claim 5, wherein:
   the threshold value is set according to amplitude ranges of the pulse interference and the signal in the communication system.

* * * * *

UNITED STATES PATENT AND TRADEMARK OFFICE
CERTIFICATE OF CORRECTION

PATENT NO. : 9,853,745 B2  
APPLICATION NO. : 14/899125  
DATED : December 26, 2017  
INVENTOR(S) : Ming Gao et al.

Page 1 of 1

It is certified that error appears in the above-identified patent and that said Letters Patent is hereby corrected as shown below:

On the Title Page

Assignee should read as: XI'AN ZHONGXING NEW SOFTWARE CO., LTD.

Signed and Sealed this  
First Day of May, 2018

Andrei Iancu  
*Director of the United States Patent and Trademark Office*